United States Patent [19]

Brambilla et al.

[11] Patent Number: 5,341,282
[45] Date of Patent: Aug. 23, 1994

[54] CIRCUIT FOR DETECTING SHORT-CIRCUITING OF INDUCTIVE LOAD DRIVE DEVICES

[75] Inventors: Massimiliano Brambilla, Sesto San Giovanni; Giampietro Maggioni, Cornaerdo, both of Italy

[73] Assignee: SGS-Thomson Microelectronics S.r.l., Italy

[21] Appl. No.: 865,421

[22] Filed: Apr. 8, 1992

[30] Foreign Application Priority Data

Apr. 9, 1991 [IT] Italy .................... T091A000253

[51] Int. Cl.$^5$ .......................................... G05F 1/573
[52] U.S. Cl. ........................ 363/50; 323/222; 307/132 E; 361/18; 361/87; 361/93
[58] Field of Search .................. 323/222, 272, 907; 307/125, 130, 131, 132 E, 139, 140, 141; 363/52, 55, 56; 361/87, 93, 18

[56] References Cited

U.S. PATENT DOCUMENTS

| 4,441,136 | 4/1984 | Hampshire ............................ 361/88 |
| 4,451,778 | 5/1984 | Fischer et al. ....................... 323/282 |
| 4,479,161 | 10/1984 | Henrich et al. . |
| 4,809,122 | 2/1989 | Fitzner .................................. 361/18 |
| 4,893,211 | 1/1990 | Bynum et al. ......................... 361/18 |
| 4,945,358 | 7/1990 | Wrzesinski ........................ 361/18 X |
| 4,949,211 | 8/1990 | Edwards ................................ 361/18 |

FOREIGN PATENT DOCUMENTS

| 0106743A2 | 4/1984 | European Pat. Off. . |
| 0249448A1 | 12/1987 | European Pat. Off. . |
| 2185596A | 7/1987 | United Kingdom . |

Primary Examiner—Emanuel T. Voeltz
Attorney, Agent, or Firm—Townsend and Townsend Khourie and Crew

[57] ABSTRACT

An inductive load drive device which has a switch defining an output terminal connectable to an inductive load between the output terminal and a reference potential line is provided. A first current recirculating branch is connectable parallel to the load and a control opens and closes the switch so that the load is supplied with current rising to a first predetermined value in a first increasing phase and falling to a second predetermined value in a first recirculating phase. The device detects a short-circuit between the output terminal of the control device and the reference potential line with a first current sensor for detecting current flow in the first recirculating branch during the first recirculating phase. A fault signaling circuit connected to the first current sensor produces a short-circuit signal in the absence of current in the first recirculating branch during the first recirculating phase.

16 Claims, 3 Drawing Sheets

CIRCUIT FOR DETECTING SHORT-CIRCUITING OF INDUCTIVE LOAD DRIVE DEVICES

BACKGROUND OF THE INVENTION

The present invention relates to a circuit for detecting short-circuiting of inductive load drive devices, in particular, of the device output to the supply line. Such devices are used, for example, for driving automotive electronic fuel injectors.

In electronic injection systems, fuel supply is enabled by means of an electronically controlled valve, operation of which is controlled by the magnetic field produced by an electromagnet roughly describable as an inductor wound about a core and to which a control current is supplied.

To reduce power dissipation, control is effected in two phases: a first phase requiring a strong magnetic field for opening the valve (peak phase); and a second phase in which the valve is kept open (hold phase).

FIG. 1 shows a rough half line graph of the control current $I_L$ of an injector. As can be seen, the peak phase extends up to instant $t_1$, with current $I_L$ increasing up to a maximum value $I_p$. This is followed by phase $t_1 - t_2$, in which the current falls sharply, and, from $t_2$ onwards, the actual hold phase, chopped to prevent active elements from operating in a linear zone to reduce power dissipation.

One problem for control devices of the aforementioned type is the detection of short-circuiting between the device output and the supply line, and supply of this information to further devices, such as the microprocessor controlling the electronic injection system as a whole.

In previously known circuits, short-circuiting as described above is diagnosed by the passage of a strong (short-circuit) current through the detecting circuit, as shown schematically in FIG. 2, in which the electromagnet controlling the injector valve is shown schematically by an inductor L and a resistor R, the current of which is controlled by a device 1 via a controlled power switch 2. The dotted line 8 indicates the short-circuit. An inductor L is series-connected to a sensing resistor 3, which measures the current in the inductor and is connected to a comparator 4. This compares the rise in voltage of resistor 3 with a reference value $V_{REF}$, and, when the two values match, switches to produce a short-circuit output signal.

Though straightforward in principle, the above solution is poorly reliable and difficult to implement in practice, due to the diagnosis of the short-circuit on the basis of a single reference value, which is obviously difficult to establish accurately.

For a clearer understanding of the problem, the control device referred to (the basic design of which is described, for example, in Italian Patent Application No. 68037A/90, filed on Dec. 21, 1990 by the present Applicant) will be described in more detail with reference to FIG. 3.

As shown in FIG. 3, the inductor L is connected between the supply line $V_{CC}$, constituting a reference potential line, and ground via a switch 2, in this case, a DMOS transistor. In particular, the drain terminal of transistor 2 is connected to inductor L, and defines the output point T of the control device, while its source terminal is grounded via the sensing resistor 3. The mid point V between the transistor 2 and resistor 3 is connected to a first input of three comparators 5, 6, 7, i.e., to the non-inverting inputs of the comparators 5 and 6, and the inverting input of the comparator 7. The inverting inputs of comparators 5 and 6 are connected to respective reference voltage sources 9 and 10, and the non-inverting input of comparator 7 to the source 11. The source 9 supplies a voltage $V_1$ equal to that at the terminals of resistor 3 when supplied with current $I_P$; the source 10 a voltage $V_2$ corresponding to current $I_{HH}$ (high-level hold current); and the source a voltage $V_3$ corresponding to current $I_{HL}$ (low-level hold current).

The mid-point T between the inductor L and power switch 2 is connected to the cathode of a Zener diode 18, the anode of which is series-connected to the emitter of a PNP transistor 20. The transistor 20 has its base connected to supply line $V_{CC}$, and its collector connected directly to the control terminal of the switch 2, and grounded via a resistor 21. The diode 18 and the base-emitter junction of transistor 20 define a current recirculating branch (free-wheeling branch) forming part of a loop comprising a second branch including the base-emitter junction of transistor 20 and the line to the control terminal of the switch 2, as explained in more detail later on. The control terminal of switch 2, point P, is also connected to the drain terminal of a MOS P-channel transistor 22, the source terminal of which is connected to the supply line $V_{CC}$, and the gate terminal of which is connected to the supply line via a resistor 23.

The point T is also connected to a power recirculating unit 26 formed by a first NPN transistor 15 having its collector connected to the point T, and its emitter to the supply line $V_{CC}$; a second PNP transistor 16 having its emitter connected to the point T, and its collector to the base of transistor 15; and a resistor 17 between the collector of the transistor 16 and supply line $V_{CC}$. The base of transistor 16 is controlled by a MOS transistor 42, which provides for enabling the whole of unit 26 during the hold phase.

The control device 1 also comprises an input comparator 30 having its non-inverting input connected to an input terminal 31 of the device 1 for receiving injection control signal IN; and its inverting input connected to a source 32 supplying a reference voltage $V_R$. The output of comparator 30 drives a MOS control transistor 33 having its source terminal grounded, and its drain terminal connected to the gate of transistor 22. The output of comparator 30 is also connected to the drain terminal of a further MOS transistor 34, the source terminal of which is grounded, and the gate terminal of which is connected to an output Q of a storage element or flip-flop 35. The flip-flop 35 has an input S connected to the output of an OR logic circuit 36 having two inputs connected respectively to the outputs of the comparators 5 and 6.

The output of the comparator 7 is connected to the set input S of a second flip-flop 38 and to the drain terminal of a MOS transistor 39, the source terminal of which is grounded, and the gate terminal of which is connected to an inverted output $\overline{Q}$ of a further flip-flop 50. The flip-flop 50 has a set input S connected to the output of comparator 5, and its reset input R receiving the inverted value of injection control signal IN.

A reset input R of flip-flop 38 is also connected to the inverted value of injection control signal IN, while an output Q is connected to the gate terminal of the MOS transistor 42, the source terminal of which is grounded, and the drain terminal of which is connected to the base of transistor 16 of recirculating unit 26. The output of the flip-flop 38 is also connected, via an invertor 44, to the gate terminal of a MOS transistor 45, the source terminal of which is grounded, and the drain terminal of which is connected to the output of comparator 6.

The output Q of the flip-flop 38 is also connected to a first input of an AND circuit 46, the other input of which is connected to the output of flip-flop 35. Via a delay element or timer 47, e.g., a capacitive type, the output of circuit 46 is connected to one input of an OR logic circuit 48 having a second input receiving the inverted value of injection control signal IN, and a third input connected to the output of comparator 7. Finally, the output of the OR circuit 48 is connected to the reset input of flip-flop 35.

At the start of operation of device 1, when the signal IN is low, the flip-flop 38 is reset so that its output is low, and the transistor 45 is on, thus maintaining a low output of the comparator 6. Similarly, the flip-flop 50 is reset, the transistor 39 is on, and the output of comparator 7 maintained low. Also, the flip-flop 35 is reset via the OR logic circuit 48, thus maintaining transistor 34 off, and the output of the comparator 30 is low, thus maintaining the switch 2 open, so that no current flows through the inductor L.

As soon as signal IN switches to high (instant $t_0$), comparator 30 switches so as to turn on the transistor 33, and consequently transistor 22, and to close switch 2. Inductor L is thus connected between the supply $V_{CC}$ and ground, and begins conducting an increasing current. When the current in the inductor reaches peak value $I_P$ (instant $t_1$), the comparator 5 switches to high, thus switching the flip-flop 50, which in turn switches off the transistor 39, thus releasing the output of comparator 7, which nevertheless remains low. Switching of comparator 5 also switches flip-flop 35, which turns on the transistor 34, thus turning off transistors 33, 22 and opening switch 2, so that the voltage $V_L$ at the terminals of inductor L rises rapidly to such a value as to turn on the transistor 20 and Zener diode 18.

The recirculating branch formed by the transistor 20 and diode 18 locks the voltage at the terminals of inductor L to the value at which components 20, 18 are on, so that current $I_L$ falls steadily, as shown in FIG. 1 (interval $t_1-t_2$).

At instant $t_2$, comparator 7, upon detecting the voltage $V_3$, i.e., corresponding to the current $I_{HL}$ through resistor 3, switches to high, thus switching the output Q of the flip-flop 38 to high. This in turn switches on the transistor 42, thus enabling the low voltage recirculating circuit including the unit 26; and turns off the transistor 45, thus releasing the output of comparator 6, which nevertheless remains low. Via the OR circuit 48, the high signal at the output of comparator 7 also resets flip-flop 35, output Q of which switches to low, thus turning off transistor 34 and turning on transistor 22 and switch 2, so that the current in inductor L rises.

The current in the inductor therefore continues rising until it reaches value $I_{HH}$ (instant $t_3$), at which point, the output of comparator 6 switches to high, thus switching the output Q of flip-flop 35 once more to high, and turns off transistors 33, 22 and switch 2. The opening of switch 2 again causes an increase in the voltage at point T, which, in this case, rises high enough to start recirculating unit 26. The current therefore decreases through unit 26, but, since the voltage is not sufficient for turn on again the recirculating branch including the transistor 20 and diode 18, and therefore to close switch 2, the recirculating current does not flow through resistor 3. The end of this phase is determined by the switching of the timer 47, which, enabled by circuit 46 receiving two high input signals, after a given time period (which is required for lowering current $I_L$ to roughly the $I_{HL}$ value) resets flip-flop 35, thus turning off transistor 34 and closing switch 2 (instant $t_4$).

The current in the inductor L therefore increases once more, as following instant $t_2$, and the hold phase continues in this way, supplying the inductor with a hold current oscillating between $I_{HH}$ and $I_{HL}$, thus ensuring that the injector valve remains open.

One problem on the above known circuit, therefore, is that short-circuiting may occur in either the peak or hold phase, both of which result in an increase in the current of sensing resistor 3, the value of which, however, differs according to the operating phase. Though the presence of a short-circuit does in fact switch the comparator 5 or 6 (depending on the operating phase), drawbacks are incurred as a result of the delay introduced by the circuit. In the event of short-circuiting in the peak phase, in particular, comparator 5 switches, thus switching circuit 36, flip-flop 35, transistors 34, 33, 22, and switch 2, as following instant $t_1$ under normal operating conditions. The delay in the interruption of the current supply for opening switch 2 results in an increase in current, which is difficult to evaluate, and depends on both the load and the value of the supply voltage. Under normal operating conditions (no short-circuiting), the inductive load results in an exponential increase, whereas, in the presence of a short-circuit, the current increases faster, i.e., rises to a higher value over a given time period. Moreover, the difference between the set peak value ($I_P$) and the actual value at which the switch 2 is opened (start of the high voltage recirculating phase) depends on the feedback time of the loop and the speed at which the current increases. This difference is not always easy to determine accurately and, though negligible under normal operating conditions, is not so in the event of a short-circuit.

The short-circuit is therefore difficult to define, depending as it does on the operating phase of the device, and being higher in the peak phase as compared with the hold phase.

It is an object of the present invention to provide a straightforward, reliable, compact circuit for detecting short-circuiting of a drive device of the aforementioned type.

SUMMARY OF THE INVENTION

According to the present invention, there is provided an inductive load drive device which has a switch defining an output terminal connectable to an inductive load between the output terminal and a reference potential line. A first current recirculating branch is connectable parallel to the load and a control opens and closes the switch so that the load is supplied with current rising to a first predetermined value in a first increasing phase and falling to a second predetermined value in a first recirculating phase. The device has a means for detecting a short-circuit between the output terminal of the control device and the reference potential line with a first current sensor for detecting current flow in the first recirculating branch during the first recirculating phase. A fault signaling means connected to the first current sensor produces a short-circuit signal in the absence of current in the first recirculating branch during the first recirculating phase.

The device also has a second recirculating branch responsive to the control in such a manner that following the first recirculating phase, the load is supplied with current rising to a third predetermined value and falling in a second recirculating phase. The detecting means has a second current sensor for detecting current flow in the second recirculating branch during the second recirculating phase. The second current sensor is connected to the fault signaling means for producing a short-circuit signal in the absence of current in the second recirculating branch during the second recirculating phase.

BRIEF DESCRIPTION OF THE DRAWINGS

A preferred, non-limiting embodiment of the present invention will be described by way of example, with reference to the accompanying drawings, in which.

DETAILED DESCRIPTION OF THE PREFERRED EMBODIMENT(S)

Figure 3:
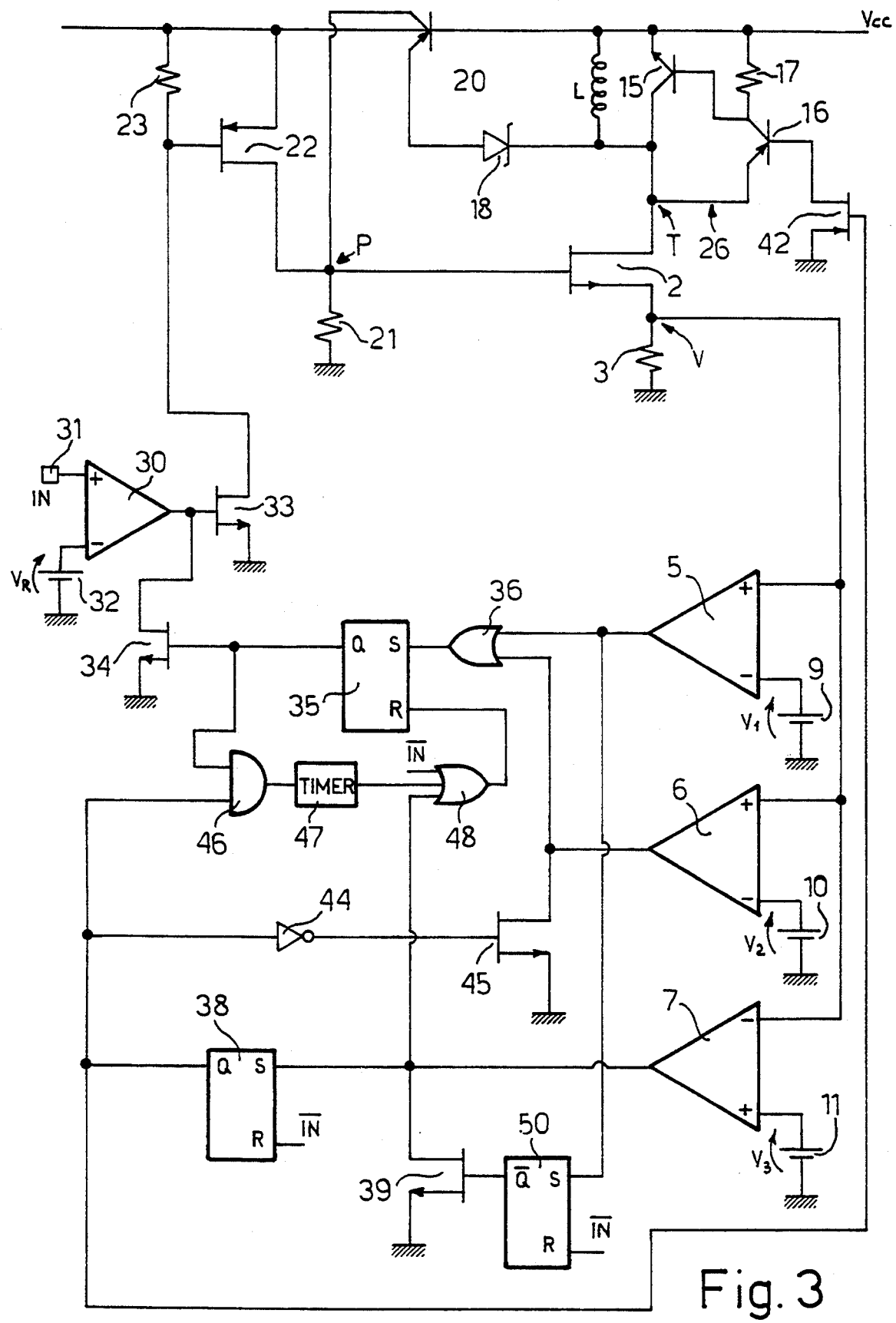
FIG. 3 shows an electric diagram of the known control device to which the present invention is applied.
Figure 4:
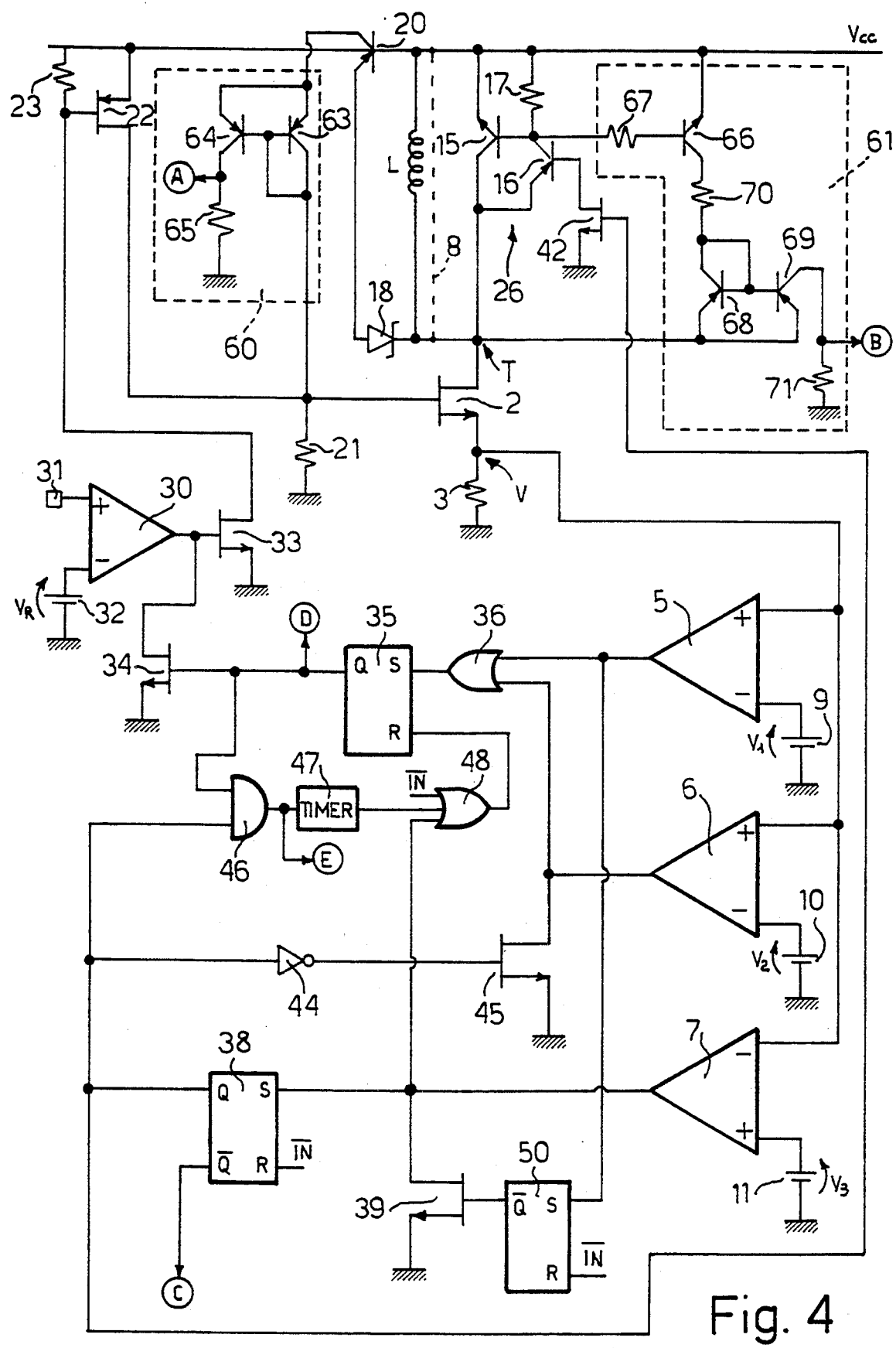

The control device 1 in FIG. 4 is more or less similar to that of FIG. 3, except for the variations described hereinafter. Any parts similar to those of the FIG. 3 device are shown using the same reference numerals, and are as already described with reference to FIG. 3.

As shown in FIG. 4, on the high voltage recirculating loop through the transistor 20 and Zener diode 18, between point T and the base of switch 2, there is provided a first recirculating current sensor indicated as a whole by reference numeral 60. Similarly, in the low voltage recirculating circuit through the recirculating unit 26 and between point T and supply line $V_{cc}$, there is provided a second recirculating current sensor indicated as a whole by reference numeral 61. The first sensor 60 is series-connected to the collector of transistor 20, and comprises a current mirror having a diode-connected PNP transistor 63 and a PNP transistor 64. The transistor 63 has its collector connected to the collector of transistor 60; its emitter connected to resistor 21 and the gate terminal of switch 2; and its base short-circuited to its collector. The transistor 64 has its emitter and base connected respectively to the emitter and base of transistor 63, and its collector grounded via the resistor 65. The midpoint between the collector of transistor 64 and resistor 65 defines a point A connected to the FIG. 5 components as described later on. The current mirror 63, 64 therefore detects the current flowing in the high voltage recirculating branch, and, via the resistor 65, produces a voltage signal which, by the appropriate sizing of the the components, is a logic signal, the high level of which indicates a current flow in the high voltage recirculating branch.

The second sensor 61 defines a second low voltage recirculating circuit connected in parallel to the circuit defined by unit 26, and supplied with current (much less than the unit 26) during the recirculating phase. The second sensor 61 comprises a first NPN transistor 66 having its emitter connected to the supply line $V_{cc}$, its base connected to the collector of transistor 16 via a resistor 67, and its collector connected to a PNP current mirror 68, 69 via a resistor 70. The mirror in turn is formed by a diode-connected transistor 68 having its emitter connected to the point T, its collector connected to resistor 70, and its base short-circulated to its collector; and a transistor 69 having its emitter and base connected respectively to the emitter and base of transistor 69, and its collector grounded via a resistor 71. The midpoint between the collector of transistor 69 and resistor 71 defined a point B connected to the FIG. 5 components as described later on. The current mirror 68, 69 therefore detects the current flowing in the low voltage recirculating branch, and, via resistor 71, produces a voltage signal which, like sensor 60, by the appropriate sizing of the components, is a logic signal, the high and low levels of which respectively indicate the presence and absence of a recirculating current (flyback current). The FIG. 4 circuit also has a point C connected to an inverted output $\overline{Q}$ of the flip-flop 38 and to the FIG. 5 components; and points D and E respectively, the output Q of flip-flop 35 and the output of the AND circuit 46.

Figure 1:
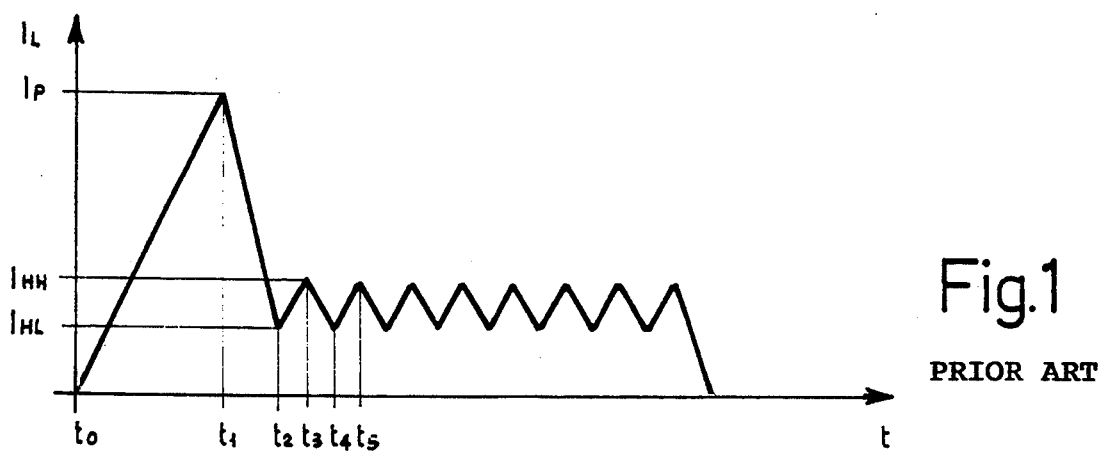
FIG. 1 shows a graph of the current in a known device.
Figure 2:
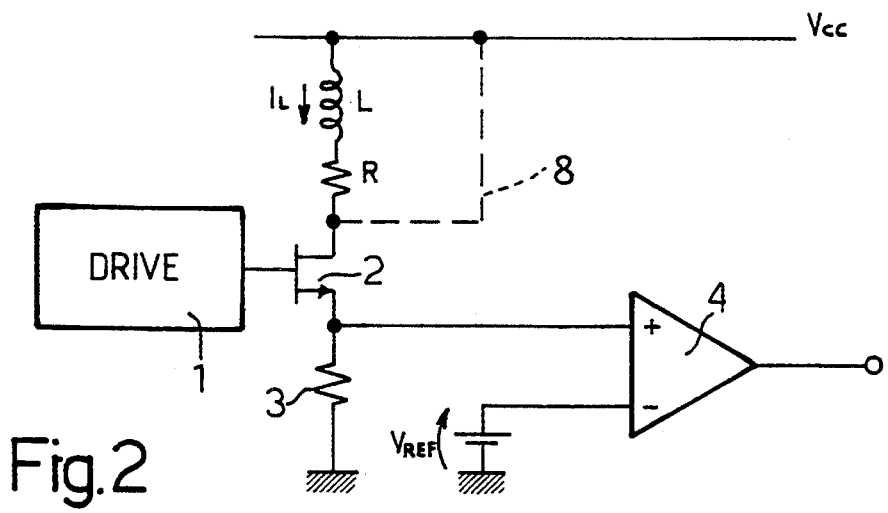
FIG. 2 shows a simplified electric diagram of a known solution.
Figure 5:
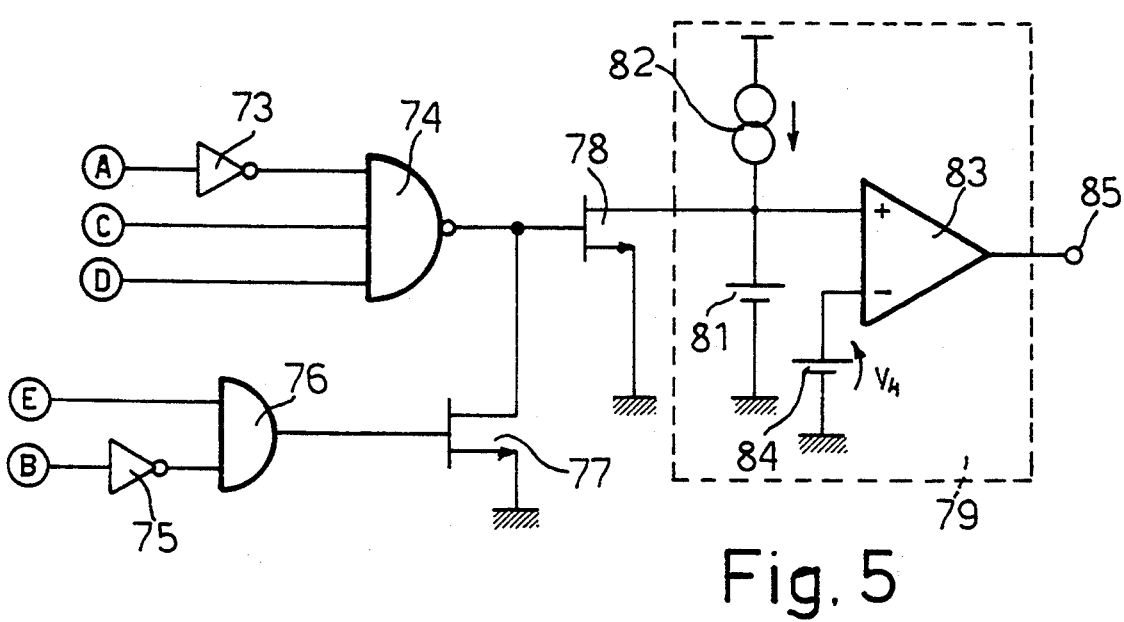
FIGS. 4 and 5 show electric diagrams of one embodiment of the circuit according to the present invention, as applied to the FIG. 3 control device.

The points A–E are shown connected to the input of the FIG. 5 circuit, which provides for producing a fault signal in the event of a short-circuit. Though shown separately for the sake of simplicity, and for more clearly illustrating the characteristics of the circuit according to the present invention, the FIG. 5 circuit, in fact, conveniently forms an integral part of the FIG. 4 circuit.

As shown in FIG. 5, the logic signal at point A is inverted by an inverter 73, and supplied to the input of a NAND circuit 74, the other two inputs of which are connected to points C and D. Conversely, the signal at point B is inverted by an invertor 75, and supplied to the input of an AND circuit 76 having another input connected to point B, and its output connected to the gate terminal of a MOS transistor 77. The transistor 77 has its source terminal grounded, and its drain terminal connected to the output of NAND circuit 74 and to the gate terminal of a further MOS transistor 78, the source terminal of which is grounded, and the drain terminal of which is connected to the input of a delay circuit 79. In the FIG. 5 example, the delay circuit 79 has a capacitor 81 having one terminal grounded and another terminal connected to a current source 82 and to the non-inverting input of a comparator 83, the inverting input of which is connected to a voltage source 84 supplying a reference voltage $V_4$. The output of comparator 83 defines the output terminal 85 of the short-circuit detecting circuit 79, when the information indicating a short-circuit is generated. The FIG. 4 control device operates as already described in connection with FIG. 3. The following description will therefore be limited solely to the operation of the short-circuit detecting circuit, with only passing reference to device 1 as required.

Initially, prior to instant $t_0$, and in the interval $t_0$–$t_1$, the output Q of flip-flop 35 is low, so that the output of NAND logic circuit 74 is high; transistor 78 is on, thus preventing the capacitor 81 from charging; and the output 85 of comparator 83 has a low logical level.

As soon as the current in inductor L reaches the peak value $I_p$, flip-flop 35 switches, thus enabling the NAND circuit 74. In this phase, output Q of flip-flop 38 is also high, and, due to the delay in activating the recirculating loop including components 20 and 18, the NAND circuit 74 switches to low, thus turning off the transistor 78 to enable the charging of capacitor 81.

If the device is operating normally (no short-circuit), at the end of the brief interval required for activating the high voltage recirculating branch (i.e., for switching the transistor 20 and diode 18), the current flowing through the recirculating branch, reflected by the current mirror 63, 64, produces a high logic signal at point A and, therefore, a low logic signal at the input of the NAND circuit 74, the output of which therefore switches once more to high so as to turn on MOS transistor 78 and discharge the capacitor 81. The output 85 of the detecting circuit therefore remains low. The delay circuit 79 is obviously sized to allow the signal at point A (and also point B, as described later on) to switch to the correct logic level before producing a short-circuit output signal.

conversely, in the event of a short-circuit between output T of control device 1 and supply line $V_{CC}$ (the dotted line 8), the high voltage recirculating branch is not activated, since the voltage at point T is too low to turn on components 20, 18. No current is detected by sensor 60, and point A maintains at a low logic level. The output of NAND circuit 74 therefore remains high, and the capacitor 81, on reaching the reference voltage $V_4$, switches the comparator 83, thus producing a high logic level signal at output 83, thus producing a high logic level signal at output 85, indicating a short-circuit.

Under normal operating conditions, the recirculating signal at point A persists up to the instant $t_2$, preventing the capacitor 81 from charging. At the end of this phase, the switching of flip-flop 38 (which supplies a slow signal at point C) disables the NAND circuit 74, the output of which thus remains high, permitting the enabling of AND circuit 76 which had been disabled by the low signal at point E (due to the low status of output Q of flip-flop 38 and the output of AND logic circuit 46 in the FIG. 4 circuit). During the hold phase, therefore, the short-circuit detecting function is entrusted to AND logic circuit 76.

In particular, during the current increase phase (interval $t_2$–$t_3$, $t_4$–$t_5$ onwards), no current is recirculated in the branch including unit 26, so that the output of sensor 61 (point B) is low. Nevertheless, the signal at point E remains low, due to the low output level of flip-flop 35 (reset by the output of comparator 7 at the end of the peak phase). As a result, the output of the AND circuit 76 is low, transistor 77 is off, and transistor 78 is maintained on by the output of the NAND circuit 74, thus preventing capacitor 81 from charging. When current $I_{HH}$ is reached, the switching of the comparator 6 switches flip-flop 35 and AND circuit 46 (FIG. 4). In this case also, the slight delay with which the low voltage recirculating circuit (unit 26) is activated, thus switching AND circuit 76 to high, turning on transistor 77, and turning off transistor 78, allows capacitor 81 to begin charging. In this phase also, however, under normal operating conditions of device 1, the current recirculated as a result of activating unit 26 and transistor 66 is supplied to the current mirror 68, 69, thus switching the signal at point B to high, so that the AND circuit 76 switches to low transistor 77 is turned off, and transistor 78 turned on to discharge capacitor 81. Conversely, as in the high voltage recirculating phase, in the presence of a short-circuit 8 between point T and supply line $V_{CC}$, the unit 26 remains inactive, the signal at point B remains low and capacitor 81 discharges to voltage level $V_4$, thus switching comparator 83 and producing a short-circuit signal at the output 85.

The advantages of the detecting circuit in FIGS. 4 and 5 are clear from the foregoing description. Firstly, the detection of a short-circuit on the basis of the absence of the recirculating current is more reliable and straightforward as compared with a current value through a sensing resistor 3. No predetermined reference current values, which are difficult to determine and, what is more, vary as a function of different operating conditions, are required. This, therefore simplifies the circuitry and provides for a more compact design.

Secondly, the detection circuit according to the present invention involves no substantial alternations to the control device, over and above connection to certain points on the device, and series connection of current mirror 63, 64 to the collector of transistor 20. Moreover, operation of the control device is in no way affected by the detecting circuit. The current mirror 63, 64 in no way affects the voltage value initiating the high voltage recirculating phase (which depends on the fall in voltage between the emitter and base of transistor 20 and in diode 18). The sensor 61, which might have created problems if series-connected to unit 26, is connected substantially parallel to the unit 26 so as to detect the passage of a low voltage recirculating current without affecting the starting voltage.

The specific embodiment shown is therefore straightforward in design, easy to implement, and integrable.

To those skilled in the art will be clear that changes may be made to the circuit as described and illustrated herein without, however, departing from the scope of the present invention. For example, the sensors 60 and 61 may be replaced by any type of device capable of detecting current flow along a supply line; the FIG. 5 logic circuit may be implemented differently; and the signals enabling and disabling circuits 74, 76 may be picked up at different points, or as different combinations of signals in the FIG. 4 circuit.

What is claimed is:

1. A circuit for detecting short-circuiting in an inductive load drive device having a switch defining an output terminal connectable to an inductive load between said output terminal and a reference potential line; at least a first current recirculating branch connectable parallel to the load; control means for opening and closing said switch, so that said load is supplied with current rising to a first predetermined value in a first increasing phase and falling to a second predetermined value in a first recirculating phase; said circuit comprising means for detecting a short-circuit between said output terminal of said switch and said reference potential line, said detecting means having a first current sensor for detecting current flow in said first recirculating branch during said first recirculating phase.

2. A circuit as claimed in claim 1, further comprising fault signaling means connected to said first current sensor for producing a short-circuit signal in the absence of current in said first recirculating branch during said first recirculating phase.

3. A circuit as claimed in claim 2 wherein said inductive load drive device has a second recirculating branch controlled by said control means in such a manner that said load, following said first recirculating phase, is supplied with current rising to a third predetermined value and falling in a second recirculating phase; and said detecting means further having a second current sensor for detecting current flow in said second recirculating branch during said second recirculating phase; said second current sensor being connected to said fault signaling means for producing said short-circuit signal in the absence of current in said second recirculating branch during said second recirculating phase.

4. A circuit as claimed in claim 2, wherein said first recirculating branch forms part of a recirculating loop comprising a recirculating line connecting said reference potential line to said switch, and said first sensor comprises a current mirror circuit in the path of said recirculating line.

5. A circuit as claimed in claim 4 wherein said current mirror circuit comprises a first diode-connected transistor connected between said reference potential line and said switch; and a second transistor having its base and emitter terminals connected respectively to the base and emitter terminals of said transistor, and its collector terminals connected to means for producing a first logic signal indicating the presence or absence of recirculating current.

6. A circuit as claimed in any one of the foregoing claims from 3 to 5, said second current sensor comprises a detecting line connected parallel to said second recirculating branch and comprising a second current mirror circuit.

7. A circuit as claimed in claim 6, wherein said second recirculating branch comprises a voltage-controlled switch having an enabling terminal receiving an enabling signal from a control element; and said detecting line comprises a controlled switch element having a control terminal connected to said control element and receiving said enabling signal; said switch element being series-connected to said second current mirror circuit.

8. A circuit as claimed in claim 6, said second current mirror circuit comprises a third diode-connected transistor in the path of said detecting line; and a fourth transistor having its base and emitter terminals connected respectively to the base and emitter terminals of said third transistor, and its collector terminals connected to converting means for producing a second logic signal indicating the presence or absence of recirculating current.

9. A circuit as claimed in claim 7, said second current mirror circuit comprises a third diode-connected transistor in the path of said detecting line; and a fourth transistor having its base and emitter terminals connected respectively to the base and emitter terminals of said third transistor, and its collector terminals connected to converting means for producing a second logic signal indicating the presence or absence of recirculating current.

10. A circuit as claimed in claim 2, wherein said fault signaling means comprises a delay element.

11. A circuit as claimed in claim 10, wherein said delay element comprises a capacitive element connected to a first input of a comparator for omparing the voltage of said capacitive element with a reference value, and for producing said short-circuit signal in the event said voltage of said capacitive element matches said reference value.

12. A circuit as claimed in claim 11 further comprising first logic means for producing a third recirculating logic signal indicating said first recirculating phase; said fault signaling means having a first logic circuit receiving said first and third recirculating logic signals and output connected to said capacitive element said first logic circuit producing a charge enabling signal in the absence of said first logic signal and in the presence of said third logic signal.

13. A circuit as claimed in claim 11 or 12 further comprising second logic means for producing a fourth recirculating logic signal indicating said second recirculating phase; said fault signaling means having a second logic circuit receiving said second and fourth recirculating logic signals and output connected to said capacitive element; said second logic circuit producing a charge enabling signal in the absence of said second logic signal and in the presence of said fourth logic signal.

14. An inductive load drive device comprising
   a switch defining an output terminal connectable to an inductive load between said output terminal and a reference potential line;
   at least a first current recirculating branch connectable parallel to the load;
   control means for opening and closing said switch, so that said load is supplied with current rising to a first predetermined value in a first increasing phase and falling to a second predetermined value in a first recirculating phase; and
   a detecting circuit for detecting a short-circuit between said output terminal and said reference potential line; said detecting circuit having a first current sensor for detecting current flow in said first recirculating branch during said first recirculating phase.

15. A device as claimed in claim 14, wherein said detecting circuit comprises fault signaling means connected to said first current sensor, for producing a short-circuit signal in the absence of current in said first recirculating branch during said first recirculating phase.

16. A device as claimed in claim 15, further comprising a second recirculating branch controlled by said control means in such a manner that said load, following said first recirculating phase, is supplied with current rising to a third predetermined value and then decreasing in value during a second recirculating phase; said detecting circuit comprising a second current sensor for detecting current flow in said second recirculating branch in said second recirculating phase; said second sensor being connected to said fault signaling means for producing said short-circuit signal in the absence of current in said second recirculating branch during said second recirculating phase.

* * * * *